United States Patent
Zhang

(10) Patent No.: US 12,132,705 B2
(45) Date of Patent: Oct. 29, 2024

(54) MESSAGE PROCESSING

(71) Applicant: New H3C Security Technologies Co., Ltd., Anhui (CN)

(72) Inventor: Xiaohong Zhang, Beijing (CN)

(73) Assignee: New H3C Security Technologies Co., Ltd., Anhui (CN)

( * ) Notice: Subject to any disclaimer, the term of this patent is extended or adjusted under 35 U.S.C. 154(b) by 363 days.

(21) Appl. No.: 17/275,921

(22) PCT Filed: Sep. 27, 2019

(86) PCT No.: PCT/CN2019/108517
§ 371 (c)(1),
(2) Date: Mar. 12, 2021

(87) PCT Pub. No.: WO2020/063853
PCT Pub. Date: Apr. 2, 2020

(65) Prior Publication Data
US 2022/0038426 A1 Feb. 3, 2022

(30) Foreign Application Priority Data
Sep. 28, 2018 (CN) .......................... 201811141921.4

(51) Int. Cl.
*G06F 21/00* (2013.01)
*H04L 9/40* (2022.01)
(52) U.S. Cl.
CPC ...... *H04L 63/0254* (2013.01); *H04L 63/0236* (2013.01); *H04L 63/0263* (2013.01); *H04L 63/20* (2013.01)
(58) Field of Classification Search
CPC ............. H04L 63/0254; H04L 63/0236; H04L 63/0263; H04L 63/20; H04L 63/1416; H04L 63/1425
See application file for complete search history.

(56) References Cited

U.S. PATENT DOCUMENTS

2008/0295175 A1   11/2008   Ansari
2011/0055921 A1*  3/2011    Narayanaswamy ........................ H04L 63/1458
                                                                                                 726/22

(Continued)

FOREIGN PATENT DOCUMENTS

CN    101345755 A       1/2009
CN    101505218 A  *    8/2009

(Continued)

OTHER PUBLICATIONS

International Search Report mailed on Jan. 2, 2020, issued in connection with International Application No. PCT/CN2019/108517, filed on Sep. 27, 2019, 5 pages.

(Continued)

*Primary Examiner* — Michael M Lee
(74) *Attorney, Agent, or Firm* — McDonnell Boehnen Hulbert & Berghoff LLP

(57) ABSTRACT

Disclosed are a packet processing method and apparatus applicable to a network device. The method comprises: receiving a first packet; determining the number of second packets received within a preset duration after the first packet passes basic detection successfully, wherein packet information of the second packet is identical to first packet information of the first packet; determining whether the number of the second packets received is greater than a preset number threshold; if so, removing a first table entry from a fast forwarding table, wherein the first table entry contains second packet information of the first packet; and performing attack detection on the first packet. With the application of the technical solution provided by an example of the present disclosure, the security risk in a network device is efficiently reduced.

11 Claims, 4 Drawing Sheets

(56) References Cited

U.S. PATENT DOCUMENTS

| | | | | |
|---|---|---|---|---|
| 2011/0066896 A1* | 3/2011 | Ebina | ............... | G06F 13/385 |
| | | | | 714/E11.179 |
| 2012/0144483 A1* | 6/2012 | Song | ............... | H04L 63/1458 |
| | | | | 726/22 |
| 2013/0182721 A1 | 7/2013 | Zhang et al. | | |
| 2015/0229670 A1* | 8/2015 | Wei | ............... | H04L 63/1466 |
| | | | | 726/23 |
| 2015/0326589 A1* | 11/2015 | Smith | ............... | H04L 63/02 |
| | | | | 726/1 |

FOREIGN PATENT DOCUMENTS

| | | | | | |
|---|---|---|---|---|---|
| CN | 101883054 A | 11/2010 | | | |
| CN | 101945117 A | 1/2011 | | | |
| CN | 102255804 A | 11/2011 | | | |
| CN | 101820396 B | 4/2012 | | | |
| CN | 102404148 A | 4/2012 | | | |
| CN | 102594816 A | 7/2012 | | | |
| CN | 103384252 A | 11/2013 | | | |
| CN | 104506548 A | 4/2015 | | | |
| CN | 104580107 A | 4/2015 | | | |
| CN | 104702560 A | 6/2015 | | | |
| CN | 106330715 A | 1/2017 | | | |
| CN | 107547503 A | 1/2018 | | | |
| CN | 108134748 A | * | 6/2018 | ............ | H04L 45/74 |
| CN | 108429731 A | 8/2018 | | | |
| CN | 108566344 A | 9/2018 | | | |
| JP | 2006314077 A | 11/2006 | | | |
| JP | 2008060865 A | 3/2008 | | | |
| KR | 101701310 B1 | * | 2/2017 | | |

OTHER PUBLICATIONS

Written Opinion mailed on Jan. 2, 2020, issued in connection with International Application No. PCT/CN2019/108517, filed on Sep. 27, 2019, 3 pages.

* cited by examiner

MESSAGE PROCESSING

CROSS-REFERENCE TO RELATED APPLICATIONS

The present application is a U.S. National Phase Application under 35 U.S.C. § 371 of International Application No. PCT/CN2019/108517 filed Sep. 27, 2019, which claims the priority of Chinese patent application No. 201811141921.4, filed before the China National Intellectual Property Administration on Sep. 28, 2018 and entitled "Message Processing Method and Apparatus", the disclosure of each of which is incorporated herein by reference in its entirety.

BACKGROUND

At present, in order to improve the efficiency of forwarding packet, a firewall device will enable a fast forwarding function. After the fast forwarding function is enabled, a fast forwarding table is generated in the firewall device. The firewall device receives a packet, and performs basic detection on this packet, such as format detection, length detection, keyword section detection and the like.

If the packet passes the basic detection successfully, but there are no table entry that contains packet information (such as five-tuples information) of the packet in the fast forwarding table, the firewall device will determine that this packet is the first packet of a service and then perform attack detection on this packet.

If the packet passes the basic detection successfully and there is a table entry that contains packet information of the packet in the fast forwarding table, the firewall device will determine that the packet is not the first packet of a service and then forward this packet.

DETAILED DESCRIPTION

Figure 1:
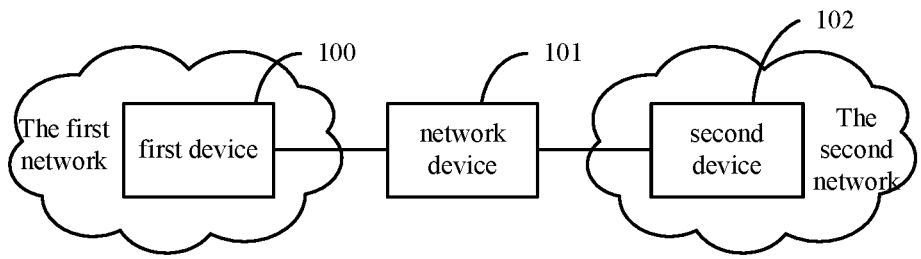
FIG. 1 is a schematic diagram of a network scenario according to an example of the present disclosure.

The technical solutions in the examples of the present disclosure will be described clearly and completely below with reference to the accompanying drawings in the examples of the present disclosure. Obviously, the described examples are only some of the examples of the present disclosure, rather than all of the examples. All other examples obtained based on the examples of the present disclosure by those skilled in the art without any creative work fall into the protection scope defined by the present disclosure.

Before the introduction of the examples of the present disclosure, some terms in the example of the present disclosure will be explained first.

Basic Detection: refers to detecting a packet to determine whether the packet is legitimate. Basic detection may include one or more types of detection, each of which has a corresponding detection strategy.

When information in the packet matches with a detection strategy for a certain type of detection, it can be considered that the packet passes this type of detection successfully, i.e., the result of this type of detection is successful. When information in the packet does not match with a detection strategy for a certain type of detection, it can be considered that the packet fails to pass this type of detection, i.e., the result of this type of detection is fail.

When results of all types of detection are PASS, it can be considered that the packet passes the basic detection successfully and is legitimate. When results of one or more types of detection are fail, it can be considered that the packet fails to pass the basic detection and is not legitimate. Basic detection may include, but is not limited to, multiple types of detection, such as format detection, length detection and key byte detection.

Format detection: refers to detecting whether the format of a packet matches with the format of a preset protocol. The Preset protocol may include, but are not limited to, UDP (User Datagram Protocol) and TCP (Transmission Control Protocol). If the format of the packet matches with the format of the preset protocol, it can be considered that the packet passes the format detection successfully, i.e., the result of the format detection is successful. If the format of the packet does not match with the format of the preset protocol, it can be considered that the packet fails to pass the format detection, i.e., the result of the format detection is fail. In this case, it can be considered that the packet fails to pass the basic detection and is not legitimate.

Length detection: refers to detecting whether the length of a packet exceeds a length threshold. If the length of the packet does not exceed a preset length threshold, it can be considered that the packet passes the length detection successfully, i.e., the result of the length detection is successful. If the length of the packet exceeds the preset length threshold, it can be considered that the packet fails to pass the length detection, i.e., the result of the length detection is fail. In this case, it can be considered that the packet fails to pass the basic detection and is not legitimate.

Key byte detection: refers to detecting whether the packet includes default content in a default byte. If the packet includes default content in a default byte, it can be considered that the packet passes the key byte detection successfully, i.e., the result of the key byte detection is successful. If the packet does not include the default content in a default byte, it can be considered that the packet fails to pass the key byte detection, i.e., the result of the key byte detection is fail. In this case, it can be considered that the packet fails to pass the basic detection and is not legitimate.

Attack Detection: refers to detecting whether a packet is an attack packet. Attack detection may include scanning attack detection.

Scanning attack: refers to an attacker broadcasting a large number of scanning attack packets with varying destination addresses and/or destination port numbers. This makes it necessary for network devices to deal with a large number of scanning attack packets sent by the attacker, which affects the normal service processing of the network devices.

Scanning Attack Detection: refers to detecting whether a packet is a scanning attack packet. During scanning attack detection, if the number of packets received by a network device from a device is greater than or equal to a number threshold, it is determined that these packets fail to pass the scanning attack detection, i.e., the result of the scanning attack detection indicates that the packets sent by the device are scanning attack packets. If the number of packets received by a network device from a device is smaller than a number threshold, it is determined that these packet pass the scanning attack detection successfully, i.e., the result of the scanning attack detection indicates that the packets sent by the device are not scanning attack packets.

Scanning attacks may be divided into IP (Internet Protocol) scanning attacks and port scanning attacks. Correspondingly, scanning attack detection includes IP scanning attack detection and port scanning attack detection.

IP Scanning Attack: refers to an attacker broadcasting to the network a large number of IP scanning attack packets with different destination IP addresses, which makes it necessary for network devices to deal with a large number of IP scanning attack packets sent by the attacker and affects the normal service processing of the network devices.

During IP scanning attack detection, if the number of packets with the same source IP address and different destination IP addresses received by a network device is greater than or equal to a number threshold, it is determined that these packets fail to pass the IP scanning attack detection, i.e., the result of the IP scanning attack detection indicates that the packets from this source IP address are IP scanning attack packets. Otherwise, it is determined that these packets pass the IP scanning attack detection, i.e., the result of the IP scanning attack detection indicates that the packets from this source IP address are not IP scanning attack packets.

Port Scanning Attack: refers to an attacker broadcasting to the network a large number of port scanning attack packets with the same source and destination IP addresses but different destination ports, which makes it necessary for network devices to deal with a large number of port scanning attack packets sent by the attacker and affects the normal service processing of the network devices.

During port scanning attack detection, if the number of packets with the same source and destination IP addresses but different destination ports received by a network device is greater than or equal to a number threshold, it is determined that these packets fail to pass the port scanning attack detection, i.e., the result of the port scanning attack detection indicates that the packets with the same source and destination IP addresses are port scanning attack packets. Otherwise, it is determined that these packets pass the port scanning attack detection successfully, i.e., the result of the port scanning attack detection indicates that the packets with the same source and destination IP addresses are not port scanning attack packets.

At present, a networking shown in FIG. 1 may include a first device 100 that is located in a first network, a network device 101 and a second device 102 that is located in a second network. The network device 101 serves as a connection device between the first network and the second network, which is responsible for forwarding packets sent by devices in the first network to devices in the second network and forwarding packets sent by devices in the second network to devices in the first network. The network device 101 may be a communication device such as a firewall device, a three-layer switch, or a router.

After enabling a fast forwarding function, the network device 101 may set up a fast forwarding table based on the packet information (e.g. five-tuples information) of the transmitted packet. The packet transmitted by the network device 101 may be a packet sent by the first device 100 or a packet sent by the second device 102. The following is illustrated with a packet sent by the first device 100 as an example.

The network device 101 receives a packet 1 sent by the first device 100, and performs basic detection on this packet. After the packet 1 passes the basic detection successfully, the network device 101 detects whether there is a table entry 1 including the packet information of the packet 1 in a fast forwarding table. If not, the network device 101 performs attack detection (such as a scanning attack detection) on packet 1. If the packet 1 passes the attack detection successfully, i.e., the packet 1 is not an attack packet, the network device 101 establishes a table entry 1 including the packet information of the packet 1 in the fast forwarding table and forwards the packet 1. If the packet 1 fails to pass the attack detection, i.e., the packet 1 is an attack packet, the packet 1 is processed according to a configured packet processing action.

If the network device 101 detects that a table entry 1 is contained in the fast forwarding table, the network device 101 forwards the packet 1.

Based on the characteristics of the fast forwarding function mentioned above (i.e., no attack detection is performed on the packet with a corresponding table entry in the fast forwarding table), the attacker may attack the network device 101 by using the table entry data in the fast forwarding table, which results in a great security risk in the network device 101.

In order to reduce the security risk in network devices, an example of the present disclosure provides a packet processing method. The packet processing method is applicable to a network device, such as the network device 101 shown in FIG. 1. In an example of the present disclosure, the network device may be a communication device such as a firewall device, a three-layer switch, or a router.

In the packet processing method according to an example of the present disclosure, after a first packet received by a network device passes the basic detection successfully, the network device performs potential-attack detection on the first packet, i.e., the network device determines the number of second packets received within a preset duration, wherein, the packet information of the second packet is identical to the first packet information of the first packet; if the number of the second packets is larger than a preset number threshold, the network device may determine that the first packet is a suspected attack packet and remove a first table entry including the second packet information of the first packet from the fast forwarding table. In this way, even if the first packet is not the first one of the packets of a service, there will be no first table entry that contains the second packet information of the first packet in the fast forwarding table. Then, the network device can perform attack detection on the first packet and the security risk in the network device is reduced.

The specific implementation of the packet processing method provided by an example of the present disclosure will be described in detail as follows.

Figure 2:
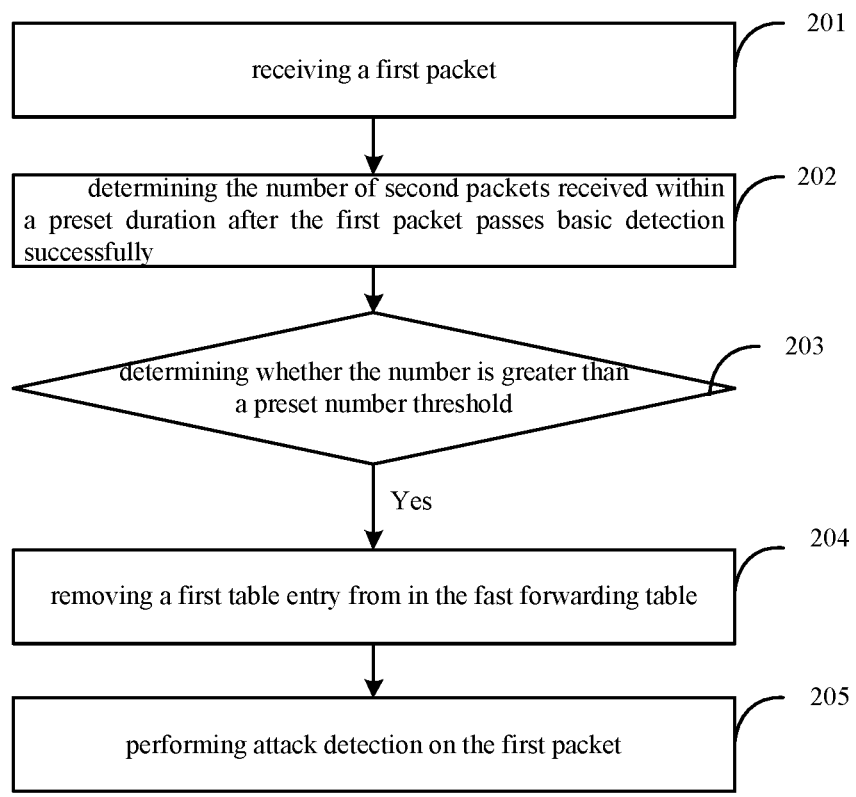
FIG. 2 is a first schematic flowchart of a packet processing method according to an example of the present disclosure.

Referring to FIG. 2, a flow diagram of a packet processing method provided by a first example of the present disclosure is disclosed. The method is applicable to a network device, such as the network device 101 shown in FIG. 1. In the example of the present disclosure, the network device may be a device that enables a fast forwarding function. That is, the network device may establish a fast forwarding table based on the packet information of a transmitted packet. The packet processing method includes the following blocks.

At block 201, the network device receives a first packet.

The first packet may be any packet received by a network device via any interface. The first packet may be or not be the first one of the packets of a service. The first packet may be a TCP packet, a UDP packet or a packet based on another protocol. In the example of the present disclosure, the first packet is illustrated as an example only without any limitation.

As shown in FIG. 1, the first packet may be a packet sent by the first device 100 or a packet sent by the second device 102.

At block 202, the network device determines the number of second packets received within a preset duration after the first packet passes the basic detection successfully. The packet information of the second packet is identical to the first packet information of the first packet.

Wherein, the first packet information may include the source IP address of a packet, the source and destination IP addresses of a packet, as well as the three-tuples information, five-tuples information or seven-tuples information of a packet. In the example of the present disclosure, the first packet information may be a default setting of a network device or may be customized by the user, which is not specifically limited in the example of the present disclosure.

In the example of the present disclosure, the preset duration may be a default setting of a network device or may be customized by the user. For example, the default duration may be 10 seconds, 1 minute, etc.

After receiving the first packet, the network device performs basic detection on the first packet. If the first packet fails to pass the basic detection, the network device may determine that the first packet is illegitimate and discard the first packet.

If the first packet passes the basic detection successfully, the network device performs potential-attack detection on the first packet, i.e., performs block 203: determining whether the number of the received second packets is greater than a preset number threshold. The packet information of the second packet is identical to the first packet information of the first packet. For example, the first packet information includes a source IP address, and the source IP address of the first packet is IP1. If the source IP address of a packet is IP1, the network device determines that the packet information of the packet is identical to the first packet information of the first packet. It can be understood that this packet is a second packet.

Before performing block 203, the network device may determine the number of second packets received within a preset duration.

For example, the preset duration is 1 minute and the current time is 10:00. After determining that the first packet passes the basic detection successfully, the network device may determine the number of second packets received within 9:59-10:00. The packet information of the second packet is identical to the first packet information of the first packet.

In an example of the present disclosure, the network device may determine the number of second packets received within a preset duration based on the preset duration and a rate at which the second packets are received within the preset duration.

In an example, the network device may determine the number S of second packets received within a preset duration using formula (1).

$$S=t\times v \quad (1)$$

Wherein, t is a preset duration and v is a rate at which second packets are received within the preset duration.

For example, if t is 10 seconds and v is 3 per seconds, the network device may determine the number of second packets received within a preset duration of 10 seconds is $S=10\times 3=30$.

In another example, the network device may determine the number S of second packets received within a preset duration using formula (2).

$$S=t\times v(1+\Delta s\%) \quad (2)$$

Wherein, t is the preset duration and v is the rate at which the second packets are received within the preset duration, $\Delta s$ is a preset tolerance with a range from 0 to 100. Wherein, the tolerance may be understood as the allowable error of the number of packets.

For example, if t is 20 seconds, v is 3 per seconds and $\Delta s$ is 50, the network device may determine the number of second packets received within a preset duration of 20 seconds is $S=20\times 3(1+50\%)=90$.

Here, $\Delta s$ may be configured according to the requirements of the security level. The smaller $\Delta s$ is, the more likely the massage is an attack packet, i.e., the more the sensitivity to suspected attack packets is, the higher the security level is. For example, a correspondence between the security level and $\Delta s$ is illustrated in Table 1.

TABLE 1

| Security level | $\Delta s$ |
| --- | --- |
| 1 | 10 |
| 2 | 30 |
| 3 | 50 |

In Table 1, the security level is 1, 2, 3. Wherein, the smaller the value of the security level is, the higher the security level is. Based on Table 1, if the security level of a network device is 1, the network device determines that $\Delta s$ is 10, and then determines the number S of second packets received within a preset duration using formula (2) with $\Delta s$ of 10.

At block 203, the network device determines whether the number of the second packets received is greater than a preset number threshold. If so, block 204 is performed.

In the example of the present disclosure, the network device is configured with a preset number threshold. After determining the number of the second packets received within the preset duration, the network device determines whether this number is greater than the preset number threshold. If the number of the second packets is larger than the preset number threshold, the first packet is determined as a suspected attack packet, i.e., the first packet may be an attack packet, and then block 204 is performed.

At block 204, the network device removes the first table entry from the fast forwarding table. The first table entry contains the second packet information of the first packet. The second packet information may contain the first packet information. The second packet information may be, but is not limited to, five-tuples information, three-tuples information and seven-tuples information.

When the first packet is determined as a suspected attack packet, the network device may remove the first table entry from the fast forwarding table so as to avoid the direct forwarding of the first packet by the network device.

In an example, after determining that the first packet is a suspected attack packet, the network device detects whether there is a first table entry that contains the second packet information of the first packet in the fast forwarding table. If there is a first table entry, the network device may remove the first table entry and then perform block 205. Otherwise, the network device may perform block 205.

At block 205, the network device performs attack detection on the first packet. Attack detection may be, but is not limited to, scanning attack detection.

After the network device removes the first table entry from the fast forwarding table, the first table entry is not present in the fast forwarding table, and then attack detection is performed on the first packet.

Since the first table entry in the fast forwarding table is removed by the network device after the first packet is determined as a suspected attack packet, even if the first packet is not the first one of the packets of a service, there will not be a first table entry that contains the second packet information of the first packet in the fast forwarding table, and the network device can perform attack detection on the first packet.

If the first packet passes the attack detection successfully, the network device establishes in the fast forwarding table a table entry containing the second packet information of the first packet and forwards the first packet.

If the first packet fails to pass the attack detection, the network device processes the first packet according to the configured packet processing action (e.g., discards the first packet), which reduces the security risk existing in the network device.

In an example of the present disclosure, if it is determined at block 203 that the number of the second packets received within a preset duration is not greater than a preset number threshold, the network device may determine whether there is a first table entry in the fast forwarding table. If no first table entry is present in the fast forwarding table, the network device may perform attack detection on the first packet. Otherwise, the network device may forward the first packet.

In an example of the present disclosure, the network device is configured with a security domain, each of which includes one or more interfaces. Rules configured in the network device in advance may include at least one of a preset duration, a preset number threshold and a preset tolerance, which are not limited herein. In an example, one rule can be applied to one security domain, i.e., one rule corresponds to one security domain. For example, there are currently two rules, i.e., rule 1 and rule 2, and there are currently two security domains, i.e., security domain 11 and security domain 12. Wherein, rule 1 is applied (i.e., corresponds) to security domain 11, and rule 2 is applied (i.e., corresponds) to security domain 12. In another example, one rule can be applied to multiple security domains, i.e., one rule corresponds to multiple security domains. For example, there are currently two rules, i.e., rule 1 and rule 2, and there are currently two security domains, i.e., security domain 11 and security domain 12. Wherein, rule 1 is applied (i.e., corresponds) to security domain 11 and security domain 12.

Figure 3:
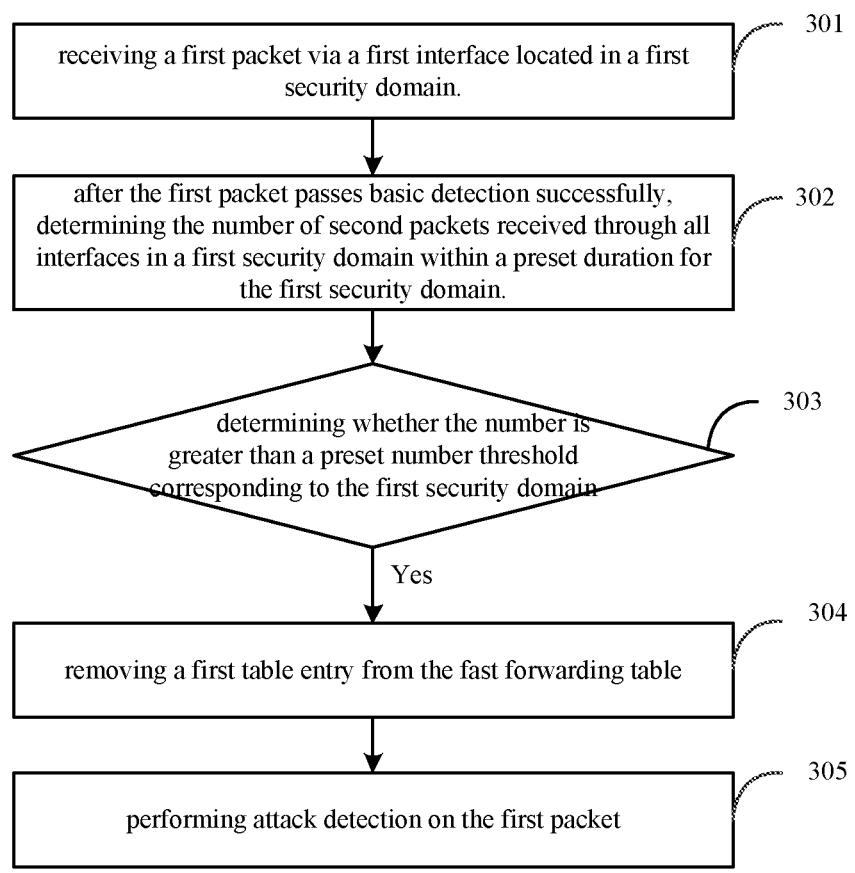
FIG. 3 is a second schematic flowchart of a packet processing method according to an example of the present disclosure.

In the application scenario of a security domain, for example, the network device 101 in FIG. 1 includes interfaces 1-5, which may be divided into two security domains. Wherein, interfaces 1-3 are located in security domain 11 and interfaces 4-5 are located in security domain 12. A packet processing method provided by an example of the present disclosure is shown in the schematic flow chart of FIG. 3. The packet processing method is performed by a network device, and may include the following blocks.

At block 301, the network device receives a first packet via a first interface located in a first security domain.

The first interface may be any interface in any security domain in the network device. In the example of the present disclosure, only the first interface located in the first security domain is illustrated as an example without any limitation.

The first packet may be any packet received by a network device via any interface. In the example of the present disclosure, a packet received via the first interface is taken as example of the first packet. The first packet may be or not be the first one of the packets of a service. The first packet may be a TCP packet, a UDP packet or a packet based on another protocol. In the example of the present disclosure, the first packet is illustrated as an example only without any limitation.

For example, the network device 101 in FIG. 1 includes interfaces 1-5, which may be divided into two security domains. Wherein, interfaces 1-3 are located in security domain 11 and interfaces 4-5 are located in security domain 12. The first packet may be a packet sent by the first device 100 or a packet sent by the second device 102. The first interface may be located in security domain 11 or security domain 12.

At block 302, after the first packet passes basic detection successfully, the network device determines the number of second packets received via all interfaces in a first security domain within a preset duration corresponding to the first security domain. The packet information of the second packet is identical to the first packet information of the first packet.

The preset duration corresponding to the first security domain is a preset duration contained in the rule applied to the first security domain. The first security domain includes one or more interfaces, which include the first interface mentioned above. The network device determines the number of second packets received via all interfaces in the first security domain within the preset duration corresponding to the first security domain.

FIG. 1 is taken as an example for illustration again. If the first interface is interface 1 located in security domain 11, after the first packet passes the basic detection successfully, the network device 101 determines the number of second packets received via all interfaces (i.e., interface 1-3) in security domain 11 within the preset duration corresponding to security domain 11 packet.

In another example of the present disclosure, the network device may determine the number S of second packets received within a preset duration corresponding to the first security domain using formula (1) or (2). In this case, Δs is a preset tolerance corresponding to the first security domain, with a range from 0 to 100, t is a preset duration corresponding to the first security domain, v is the sum of the rates at which all interfaces included in the first security domain receive the second packets within the preset duration corresponding to the first security domain. In this case, formula (1) may be transformed into formula (3):

$$S = t \times (v_1 + v_2 + \ldots + v_i + \ldots + v_n) \quad (3)$$

Formula (2) may be transformed into formula (4):

$$S = t \times (v_1 + v_2 + \ldots + v_i + \ldots + v_n) \times (1 + \Delta s\%) \quad (4)$$

Wherein, $v_i$ is a rate at which the $i^{th}$ interface included in the first security domain receives the second packets within the preset duration corresponding to the first security domain.

For example, the network device determines the number S of second packets received within a preset duration using formula (4). Security domain 11 includes three interfaces, i.e., interface 1, interface 2 and interface 3. The preset duration corresponding to security domain 11 is 10 seconds, and the preset tolerance corresponding to security domain 11 is 50. If the rate at which second packets are received in 10 seconds is 1 per second for interface 1, 2 per second for interface 2 and 3 per second for interface 3, the network device may determine the number S of the second packets received is S=10×(1+2+3)×(1+50%)=90.

At block 303, the network device determines whether the number of the second packets received is greater than a preset number threshold corresponding to the first security domain. If so, block 304 is performed.

The preset number threshold corresponding to the first security domain is a preset number threshold contained in the rule applied to the first security domain. After the number of the received second packets is determined, the network device determines whether this number is greater than a preset number threshold corresponding to the first security domain.

If the number of the second packets is greater than a preset number threshold corresponding to the first security domain, the network device determines the first packet as a suspected attack packet and performs block 304.

In an example, if the number of the second packets is not greater than a preset number threshold corresponding to the first security domain, the network device may determine whether a first table entry is present in the fast forwarding table. If no first table entry is present in the fast forwarding table, the network device may perform attack detection on the first packet. Otherwise, the network device may forward the first packet.

At block 304, the network device removes the first table entry from the fast forwarding table. The first table entry contains the second packet information of the first packet. The second packet information may contain the first packet information. The second packet information may be, but is not limited to, five-tuples information, three-tuples information and seven-tuples information.

At block 305, the network device performs attack detection on the first packet. Attack detection may be, but is not limited to, scanning attack detection.

Blocks 304-305 are identical to blocks 204-205.

By means of this packet processing method, even if the first packet is not the first one of the packets of a service in a first security domain, there will be no first table entry that contains the second packet information of the first packet in the fast forwarding table. Then, the network device can perform attack detection on the first packet and the security risk in the first security domain and the network device is reduced.

Figure 4:
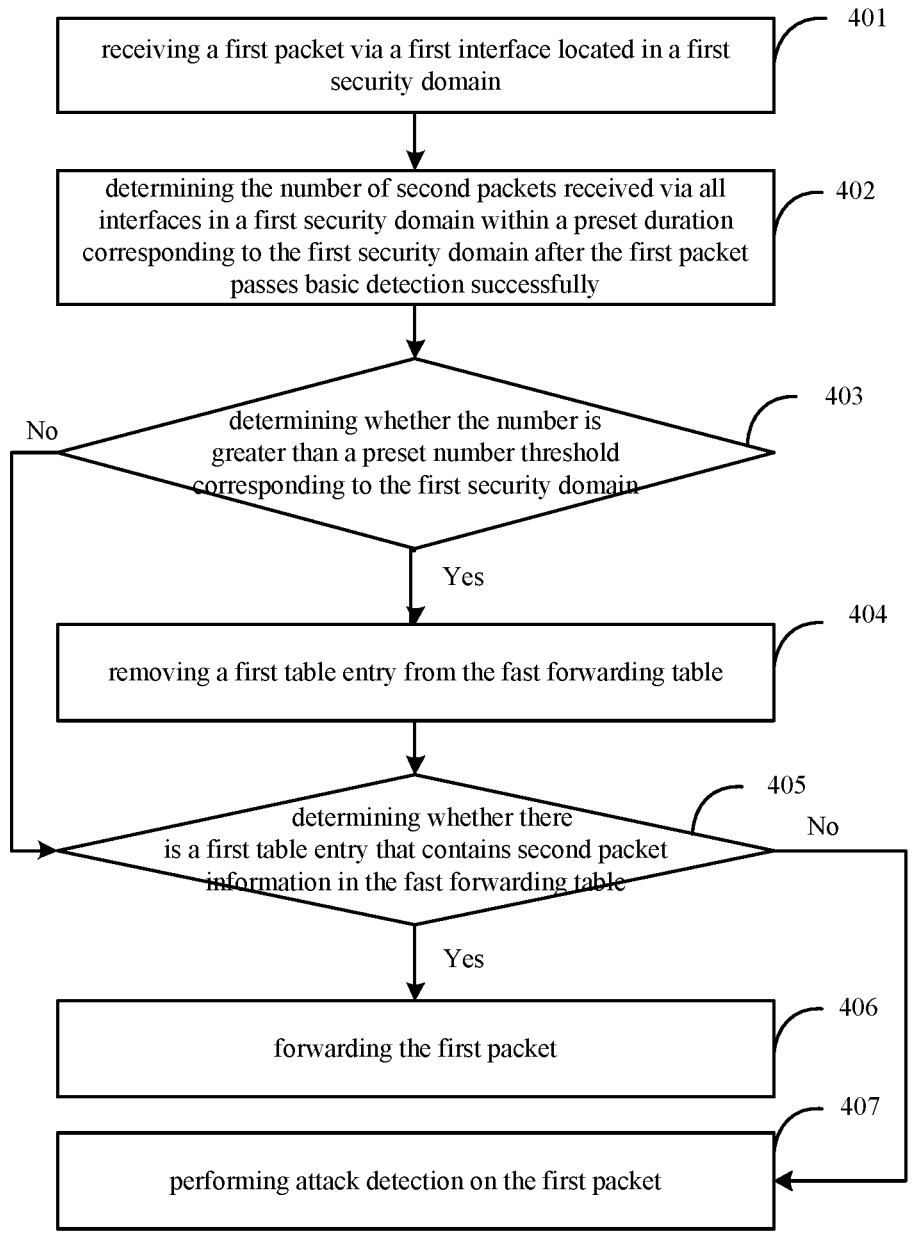
FIG. 4 is a third schematic flowchart of a packet processing method according to an example of the present disclosure.

In another example of the present disclosure, the above-mentioned packet processing procedure can be added in addition to the previous fast forwarding function. That is, potential-attack detection is added between the basic detection of a packet and the determination of whether the second packet information is in the fast forwarding table. Specifically, reference can be made to the flowchart of the third packet processing method shown in FIG. 4.

At block 401, the network device receives a first packet via a first interface located in a first security domain.

Block 401 is identical to block 301.

At block 402, after the first packet passes basic detection successfully, the network device determines the number of second packets received via all interfaces in a first security domain within a preset duration corresponding to the first security domain. The packet information of the second packet is identical to the first packet information of the first packet.

Block 402 is identical to block 302.

At block 403, the network device determines whether the number of the second packets received is greater than a preset number threshold corresponding to the first security domain. If so, block 404 is performed. Otherwise, block 405 is performed.

Block 403 is identical to block 303. Wherein, block 403 may be the implementation process of potential-attack detection.

At block 404, the network device removes the first table entry from the fast forwarding table. The first table entry contains the second packet information of the first packet.

Block 404 is identical to block 304.

At block 405, the network device determines whether there is a first table entry that contains the second packet information in the fast forwarding table. If so, block 406 is performed. Otherwise, block 407 is performed.

Wherein, the second packet information may contain the first packet information.

At block 406, the network device forwards the first packet.

At block 407, the network device performs attack detection on the first packet.

By means of the packet processing method, even if the first packet is not the first one of the packets of a service, there will be no first table entry that contains the second packet information of the first packet in the fast forwarding table. Then, the network device performs attack detection on the first packet and the security risk in the network device is efficiently reduced.

Figure 5:
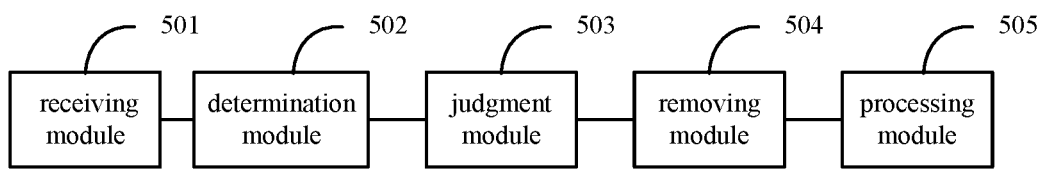
FIG. 5 is a schematic structural diagram of a packet processing apparatus according to an example of the present disclosure.

In accordance with the examples of the above packet processing method, the examples of the present disclosure further provides a packet processing apparatus. Referring to FIG. 5, a schematic structural diagram of a packet processing apparatus is provided in an example of the present disclosure. The apparatus is applicable to a network device, and includes a receiving module 501, a determination module 502, a judgment module 503, a removing module 504 and a processing module 505 as follows. The description of each module is as follows.

A receiving module 501 is used for receiving a first packet.

A determination module 502 is used for determining the number of second packets received within a preset duration after determining that the first packet passes basic detection successfully, wherein packet information of the second packet is identical to first packet information of the first packet.

A judgment module 503 is used for determining whether the number of the second packets received is greater than a preset number threshold.

A removing module 504 is used for removing a first table entry from a fast forwarding table when the judgment module determines that the number of the second packet received within the preset duration is greater than the preset number threshold, wherein the first table entry contains second packet information of the first packet.

A processing module 505 is used for performing attack detection on the first packet.

In an example of the present disclosure, the receiving module 501 may be specifically used for receiving a first packet via a first interface located in a first security domain.

The determination module 502 may be specifically used for determining the number of second packets received via all interfaces in the first security domain within a preset duration corresponding to the first security domain after the first packet passes basic detection successfully.

The judgment module 503 may be specifically used for determining whether the number of the second packets received is greater than a preset number threshold corresponding to the first security domain.

In an example of the present disclosure, the determination module 502 may be specifically used for determining the number of second packets received within a preset duration based on the preset duration and a rate at which the second packets are received within the preset duration.

In an example of the present disclosure, the determination module 502 may be specifically used for determining the number S of second packets received within a preset duration using a formula as follows:

$$S=t\times v(1+\Delta s\%);$$

Wherein, t is the preset duration and v is the rate at which the second packets are received within the preset duration, $\Delta s$ is a preset tolerance with a range from 0 to 100.

In an example of the present disclosure, the removing module 504 may be specifically used for detecting whether there is a first table entry in a fast forwarding table, and if so, removing the first table entry.

In an example of the present disclosure, the processing module 505 may be further used for, when the number of the second packets received is not greater than the preset number threshold, detecting whether there is a first table entry in a fast forwarding table; if there is no first table entry in the fast forwarding table, performing attack detection on the first packet; if there is a first table entry in the fast forwarding table, forwarding the first packet.

In the technical solution provided by the example of the present disclosure, when a first packet is received, after the first packet passes basic detection successfully, the network device determines the number of second packets received within a preset duration, wherein packet information of the second packet is identical to first packet information of the first packet; if the number of the second packets is larger than the preset number threshold, the network device removes a first table entry including the second packet information of the first packet from the fast forwarding table. In this way, even if the first packet is not the first one of the packets of a service, there will be no first table entry that contains the second packet information of the first packet in the fast forwarding table. Then, the network device can perform attack detection on the first packet and the security risk in the network device is reduced.

Figure 6:
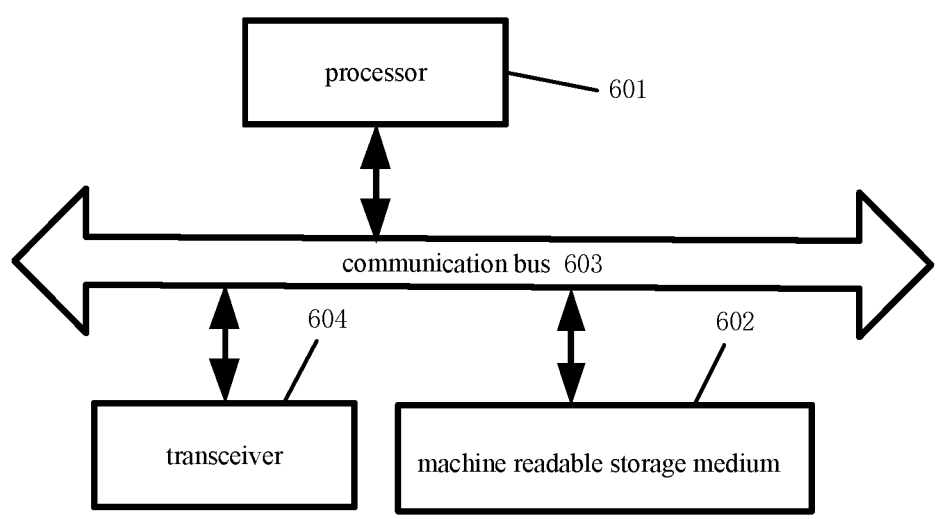
FIG. 6 is a schematic structural diagram of an electronic device according to an example of the present disclosure.

In accordance with the above example of the packet processing method, an example of the present disclosure further provides a network device, as shown in FIG. 6. The network device includes a processor 601 and a machine readable storage medium 602, which stores machine executable instructions that can be executed by the processor 601. The machine executable instructions cause the processor 601 to:

receive a first packet;

determine the number of second packets received within a preset duration after determining that the first packet passes basic detection successfully, wherein packet information of the second packet is identical to first packet information of the first packet;

determine whether the number of the second packets received is greater than a preset number threshold;

remove a first table entry from a fast forwarding table when the number of the second packet received is greater than the preset number threshold, wherein the first table entry contains second packet information of the first packet, and the second packet information may contain the first packet information;

perform attack detection on the first packet.

In an example, the machine executable instructions may cause the processor 601 specifically to:

receive a first packet via a first interface located in a first security domain;

determine the number of second packets received via all interfaces in the first security domain within a preset duration corresponding to the first security domain after the first packet passes basic detection successfully;

determine whether the number of the second packets received is greater than a preset number threshold corresponding to the first security domain.

In an example of the present disclosure, the machine executable instructions may cause the processor 601 specifically to determine the number of second packets received within a preset duration based on the preset duration and a rate at which the second packets are received within the preset duration.

In an example, the machine executable instructions may cause the processor 601 specifically to determine the number S of second packets received within a preset duration using a formula as follows:

$$S=t\times v(1+\Delta s\%);$$

Wherein, t is the preset duration and v is the rate at which the second packets are received within the preset duration, $\Delta s$ is a preset tolerance with a range from 0 to 100.

In an example, the machine executable instructions may cause the processor 601 specifically to detect whether there is a first table entry in a fast forwarding table, and if so, remove the first table entry.

In an example, the machine executable instructions may cause the processor 601 specifically to, when the number of the second packets received is not greater than the preset number threshold, detect whether there is a first table entry in a fast forwarding table; if there is no first table entry in the fast forwarding table, perform attack detection on the first packet; and if there is a first table entry in the fast forwarding table, forward the first packet.

In the technical solution provided by the example of the present disclosure, when a first packet is received, the network device determines the number of second packets received within a preset duration after the first packet passes basic detection successfully, wherein packet information of the second packet is identical to first packet information of the first packet. If the number of the second packets is larger than the preset number threshold, the network device removes a first table entry including the second packet information of the first packet from the fast forwarding table. In this way, even if the first packet is not the first one of the packets of a service, there will be no first table entry that contains the second packet information of the first packet in the fast forwarding table. Then, the network device can perform attack detection on the first packet and the security risk in the network device is reduced.

As shown in FIG. 6, the network device may also include a communication bus 603. The above processor 601 and machine readable storage medium 602 are communicated with each other via the communication bus 603, and a communication interface is used for the communication between the above network device and another device. The communication bus 603 may be a PCI (Peripheral Component Interconnection) bus or EISA (Extended Industry Standard Architecture) bus. The communication bus 603 may be divided into an address bus, a data bus and a control bus.

The communication bus 603 may connect not only the processor 601 and the machine readable storage medium 602, but also the transceiver 604 and other devices. The transceiver 604 is used to receive or send packets. For example, the transceiver 604 receives a first packet, and then sends the first packet to the processor 601. For example, the processor 601 sends the first packet to the transceiver 604, which in turn forwards the first packet.

The machine readable storage medium 602 may include RAM (Random Access Memory), or NVM (Non-Volatile Memory), such as at least one disk memory. In addition, the machine readable storage medium 602 may also be at least one storage device located far away from the aforementioned processor.

The processor 601 may be a general purpose processor, including CPU (Central Processing Unit), NP (Network Processor), DSP (Digital Signal Processing), ASIC (Application Specific Integrated Circuit), and FPGA (Field-Programmable Gate Array) or another programmable logic device, a discrete gate or a transistor logic device, a discrete hardware component.

In accordance with the examples of the packet processing method, an example of the present disclosure further provides a machine readable storage medium, which stores machine executable instructions that, when called and executed by a processor, cause the processor to:

receive a first packet;

determine the number of second packets received within a preset duration after determining that the first packet passes basic detection successfully, wherein packet information of the second packet is identical to first packet information of the first packet;

determine whether the number of the second packets received is greater than a preset number threshold;

remove a first table entry from a fast forwarding table when the number of the second packet received is greater than the preset number threshold, wherein the first table entry contains second packet information of the first packet;

perform attack detection on the first packet.

In an example, the machine executable instructions may cause the processor specifically to:

receive a first packet via a first interface located in a first security domain;

determine the number of second packets received via all interfaces in the first security domain within a preset duration corresponding to the first security domain after the first packet passes basic detection successfully;

determine whether the number of the second packets received is greater than a preset number threshold corresponding to the first security domain.

In an example of the present disclosure, the machine executable instructions may cause the processor specifically to determine the number of second packets received within a preset duration based on the preset duration and a rate at which the second packets are received within the preset duration.

In an example, the machine executable instructions may cause the processor specifically to determine the number S of second packets received within a preset duration using a formula as follows:

$$S = t \times v \times (1 + \Delta s\%);$$

Wherein, t is the preset duration and v is the rate at which the second packets are received within the preset duration, $\Delta s$ is a preset tolerance with a range from 0 to 100.

In an example, the machine executable instructions may cause the processor specifically to detect whether there is a first table entry in a fast forwarding table, and if so, remove the first table entry.

In an example, the machine executable instructions may cause the processor specifically to, when the number of the second packets received is not greater than the preset number threshold, detect whether there is a first table entry in a fast forwarding table; if there is no first table entry in the fast forwarding table, perform attack detection on the first packet; and if there is a first table entry in the fast forwarding table, forward the first packet.

In the technical solution provided by the example of the present disclosure, when a first packet is received, the network device determines the number of second packets received within a preset duration after the first packet passes basic detection successfully, wherein packet information of the second packet is identical to first packet information of the first packet. If the number of the second packets is larger than the preset number threshold, the network device removes a first table entry including the second packet information of the first packet from the fast forwarding table. In this way, even if the first packet is not the first one of the packets of a service, there will be no first table entry that contains the second packet information of the first packet in the fast forwarding table. Then, the network device can perform attack detection on the first packet and the security risk in the network device is reduced.

In accordance with the examples of the packet processing method, an example of the present disclosure further provides a machine executable instruction that, when called and executed by a processor, causes the processor to:

receive a first packet;

determine the number of second packets received within a preset duration after determining that the first packet passes basic detection successfully, wherein packet information of the second packet is identical to first packet information of the first packet;

determine whether the number of the second packets received is greater than a preset number threshold;

remove a first table entry from a fast forwarding table when the number of the second packet received is greater than the preset number threshold, wherein the first table entry contains second packet information of the first packet;

perform attack detection on the first packet.

In an example, the machine executable instructions may cause the processor specifically to:

receive a first packet via a first interface located in a first security domain;

determine the number of second packets received via all interfaces in the first security domain within a preset duration corresponding to the first security domain after the first packet passes basic detection successfully;

determine whether the number of the second packets received is greater than a preset number threshold corresponding to the first security domain.

In an example of the present disclosure, the machine executable instructions may cause the processor specifically to determine the number of second packets received within a preset duration based on the preset duration and a rate at which the second packets are received within the preset duration.

In an example, the machine executable instructions may cause the processor specifically to determine the number S of second packets received within a preset duration using a formula as follows:

$$S = t \times v(1 + \Delta s\%);$$

Wherein, t is the preset duration and v is the rate at which the second packets are received within the preset duration, Δs is a preset tolerance with a range from 0 to 100.

In an example, the machine executable instructions may cause the processor specifically to detect whether there is a first table entry in a fast forwarding table, and if so, remove the first table entry.

In an example, the machine executable instructions may cause the processor specifically to, when the number of the second packets received is not greater than the preset number threshold, detect whether there is a first table entry in a fast forwarding table; if there is no first table entry in the fast forwarding table, perform attack detection on the first packet; and if there is a first table entry in the fast forwarding table, forward the first packet.

In the technical solution provided by the example of the present disclosure, when a first packet is received, the network device determines the number of second packets received within a preset duration after the first packet passes basic detection successfully, wherein packet information of the second packet is identical to first packet information of the first packet. If the number of the second packets is larger than the preset number threshold, the network device removes a first table entry including the second packet information of the first packet from the fast forwarding table. In this way, even if the first packet is not the first one of the packets of a service, there will be no first table entry that contains the second packet information of the first packet in the fast forwarding table. Then, the network device can perform attack detection on the first packet and the security risk in the network device is reduced.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices including a series of elements comprise not only those elements listed, but also other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices which comprise the listed elements.

All examples in the description are described in a correlated manner, and identical or similar parts in various examples can be referred to one another, the description for each example all focuses on the differences with other examples. Especially, the examples of a packet processing apparatus, a network device, a machine readable storage medium and a machine executable instruction are briefly described and reference can be made to the description of the examples of a packet processing method for its related contents since the examples of the device are substantially similar to those of the packet processing method.

The examples described above are just preferable examples of the present disclosure, and not indented to limit the protection scope of the present disclosure. Any modifications, alternatives, improvements or the like within the spirit and principle of the present disclosure shall be comprised in the protection scope of the present disclosure.

What is claimed is:

1. A packet processing method, which is applied in a network device, the method comprises:
   receiving a first packet;
   determining number of second packets received within a preset duration after the first packet passes basic detection successfully, wherein packet information of the second packets is identical to first packet information of the first packet;
   determining whether the number is greater than a preset number threshold;
   in response to the determining the number is greater than the preset number threshold, determining the first packet as a suspected attack packet, removing a first table entry from a fast forwarding table wherein the first table entry contains second packet information of the first packet, to avoid direct forwarding of the first packet by the network device, and performing attack detection on the first packet, wherein the second packet information of the first packet contains the first packet information of the first packet;
   wherein, in response to the determining the number is not greater than the preset number threshold, the method further comprises:
   detecting whether there is the first table entry in the fast forwarding table;
   if there isn't the first table entry in the fast forwarding table, performing attack detection on the first packet;
   if there is the first table entry in the fast forwarding table, forwarding the first packet.

2. The packet processing method of claim 1, wherein the receiving a first packet comprises:
   receiving the first packet via a first interface located in a first security domain;
   determining the number of second packets received within the preset duration comprises:
   determining the number of second packets received via all interfaces in the first security domain within the preset duration corresponding to the first security domain;
   determining whether the number is greater than the preset number threshold comprises:
   determining whether the number is greater than the preset number threshold corresponding to the first security domain.

3. The packet processing method of claim 1, wherein the determining the number of second packets received within a preset duration comprises:
   determining the number of second packets received within a preset duration based on the preset duration and a rate at which the second packets are received within the preset duration.

4. The packet processing method of claim 3, wherein, the determining the number of second packets received within a preset duration based on the preset duration and a rate at which the second packets are received within the preset duration comprises:
   determining number S of second packets received within the preset duration by using a formula as follows:

$$S = t \times v(1 + \Delta s\ \%);$$

wherein, t is the preset duration, v is the rate at which the second packets are received within the preset duration, and Δs is a preset tolerance with a range from 0 to 100.

5. The packet processing method of claim 1, wherein, the removing a first table entry from a fast forwarding table comprises:
   detecting whether there is a first table entry in the fast forwarding table;
   if there is the first table entry in the fast forwarding table, removing the first table entry.

6. A network device, comprising a memory, a processor and a non-transitory machine readable storage medium, wherein the machine readable storage medium stores machine executable instructions and the processor is caused by the machine executable instructions to:
   receive a first packet;
   determine number of second packets received within a preset duration after the first packet passes basic detection successfully, wherein packet information of the second packets is identical to first packet information of the first packet;
   determine whether the number is greater than a preset number threshold;
   when determining that the number is greater than the preset number threshold, determine the first packet as a suspected attack packet, remove a first table entry from a fast forwarding table wherein the first table entry contains second packet information of the first packet, to avoid direct forwarding of the first packet by the network device, and perform attack detection on the first packet, wherein the second packet information of the first packet contains the first packet information of the first packet;
   wherein the processor is caused by the machine executable instructions to, when determining that the number is not greater than the preset number threshold, detect whether there is the first table entry in the fast forwarding table; if there isn't the first table entry in the fast forwarding table, perform attack detection on the first packet; and if there is the first table entry in the fast forwarding table, forward the first packet.

7. The network device of claim 6, wherein the processor is caused by the machine executable instructions to:
   receive the first packet via a first interface located in a first security domain;
   determine the number of second packets received via all interfaces in the first security domain within the preset duration corresponding to the first security domain after the first packet passes basic detection successfully;
   determine whether the number is greater than the preset number threshold corresponding to the first security domain.

8. The network device of claim 6, wherein the processor is caused by the machine executable instructions to determine the number of second packets received within the preset duration based on the preset duration and a rate at which the second packets are received within the preset duration.

9. The network device of claim 8, wherein the processor is caused by the machine executable instructions to determine number S of second packets received within the preset duration by using a formula as follows:

$$S = t \times v(1 + \Delta s\ \%);$$

wherein, t is the preset duration, v is the rate at which the second packets are received within the preset duration, and Δs is a preset tolerance with a range from 0 to 100.

10. The network device of claim 6, wherein the processor is caused by the machine executable instructions to, when determining that the number is greater than the preset number threshold, detect whether there is the first table entry in the fast forwarding table, and if there is the first table entry in the fast forwarding table, remove the first table entry.

11. A non-transitory machine readable storage medium with machine executable instructions stored thereon, which are invoked and executed by a processor to cause the processor to:
   receive a first packet;
   determine number of second packets received within a preset duration after the first packet passes basic detection successfully, wherein packet information of the second packets is identical to first packet information of the first packet;
   determine whether the number is greater than a preset number threshold;
   in response to the determining the number is greater than the preset number threshold, determine the first packet as a suspected attack packet, remove a first table entry from a fast forwarding table wherein the first table entry contains second packet information of the first packet, to avoid direct forwarding of the first packet by the network device, and perform attack detection on the first packet, wherein the second packet information of the first packet contains the first packet information of the first packet;
   wherein the machine executable instructions are invoked and executed by a processor to cause the processor to, in response to the determining the number is not greater than the preset number threshold, detect whether there is the first table entry in the fast forwarding table; if there isn't the first table entry in the fast forwarding table, perform attack detection on the first packet; and if there is the first table entry in the fast forwarding table, forward the first packet.

* * * * *